Sept. 30, 1924.

A. W. F. MANZEL

SHOCK ABSORBER

Filed May 12, 1922

1,510,185

Inventor:
Adolph W. F. Manzel,
By Emil Neuhart
Attorney.

Witness:
J. J. Oberol.

Patented Sept. 30, 1924.

1,510,185

UNITED STATES PATENT OFFICE.

ADOLPH W. F. MANZEL, OF BUFFALO, NEW YORK, ASSIGNOR TO MANZEL BROS. CO., OF BUFFALO, NEW YORK, A CORPORATION OF NEW YORK.

SHOCK ABSORBER.

Application filed May 12, 1922. Serial No. 560,292.

*To all whom it may concern:*

Be it known that I, ADOLPH W. F. MANZEL, a citizen of the United States, residing at Buffalo, in the county of Erie and State of New York, have invented certain new and useful Improvements in Shock Absorbers, of which the following is a specification.

My invention relates to an improved shock absorber, designed for the purpose of lessening shocks imparted to spring-supported vehicles bodies when caused by the vehicle traveling over uneven roads; and it relates more particularly to that type of shock absorber which may be referred to as a fluid-container, or what is generally known as an hydraulic shock absorber.

The primary object of my invention is the provision of a shock absorber of this type, which is simple in construction, highly efficient in action, and extremely sensitive so as to yield with the vehicle springs, even while traveling over cobblestone or other roads having slight regular depressions between adjoining elements forming the road surface, so as to absorb the vibrations imparted thereby to the vehicle body, and also to check the rebounds of the vehicle springs, and consequently the body supported thereby, in traveling over ruts or pronounced projections in the road, or when striking obstructions and passing over the same.

A further object of my invention is to provide a shock absorber in which a fluid, such as oil or the like is contained, and in which provision is made for maintaining, by simple means, a restricted passage of a given or predetermined area, which under the action of the vehicle springs becomes enlarged in proportion to the compression of said springs to allow the free passage of the fluid therethrough, and recovers its normal size immediately compression of said springs ceases so as to restrict or retard the passage of fluid therethrough during the return movement of said springs to their normal condition.

A further object of my invention is to provide a shock absorber of this type in which a piston is slidably fitted into a cylinder and novel means provided to automatically seal the piston with oil for the purpose of preventing the passage of air and leakage of oil between the piston and cylinder wall.

A still further object is to provide a shock absorber with two chambers, one of which serves as a cylinder and has a piston therein, and to locate between said chambers movable co-operating elements serving to regulate the flow of the fluid from one chamber to another under suction created by the piston, and reversely under pressure of the piston.

A still further object is to provide two movable co-operating elements within a passage connecting two chambers and providing means in one chamber, manipulated under the influence of a vehicle spring, to create suction and exert pressure within said passage, one of said elements only being movable under suction and both being movable under compression, but under varying pressures exerted thereagainst.

With the above and other objects in view to appear hereinafter, my invention consists in the novel features of construction, and in the arrangement and combination of parts to be hereinafter described and more particularly pointed out in the subjoined claims.

In the drawings:—

Figure 1:
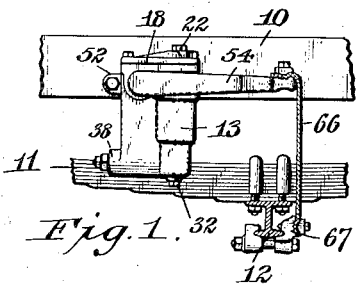
Fig. 1 is a sectional elevation of a portion of an automobile or other vehicle having my improved shock absorber applied thereto, the parts of the automobile or vehicle shown being those adjacent the shock absorber.
Figure 4:
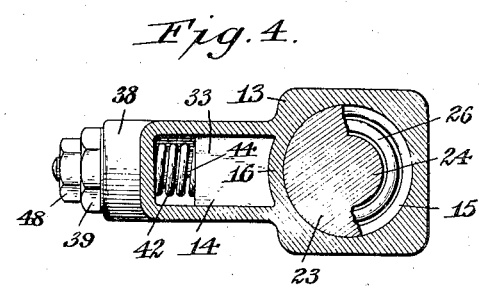
Fig. 4 is a horizontal section taken on line 4—4, Fig. 2.

In Fig. 1, I have shown the parts of an automobile to which one of my improved absorbers may be applied, and as illustrated, these parts are at the front of the automobile; it being, of course, understood that a shock absorber is provided at each side of the automobile or other vehicle and that a pair of absorbers may be used at the front or at the rear, or both at the front and the rear.

In the drawing, 10 designates the frame or chassis of an automobile, hereinafter referred to as a vehicle and 11 one of the leaf springs fastened to an axle 12 in any suitable manner.

When passing over rough roads, or entering a rut in the road, the leaf spring becomes flexed, opposite ends of the spring being forced closer to the road surface under spring flexure, with the result that the body of the vehicle, connected to said ends, is drawn downwardly. The tendency of the spring to recover after passing over the rough portion or rut of the road will throw up the body of the vehicle, and thereby unduly strain the springs and make riding uncomfortable, oftentimes causing the occupants to be forcibly raised from their seats, only to be dropped back under complete loss of control.

The body and spring, or the axle supporting the spring, may be considered as two relatively movable parts of an automobile, to one of which the body portion or casing of my shock absorber is secured, and to the other of which an element extending from said casing and controlling parts therein is connected.

The body portion or casing is designated by the numeral 13, and it is divided into two chambers 14, 15 by a vertical curved or segmental wall 16, the chamber 14 being substantially rectangular in cross section while the chamber 15 is cylindrical and serves as a cylinder. The lower ends of the chamber 14 and cylinder 15 are connected by a fluid passage 17 and the curved or segmental wall 16 extends upwardly from the wall of said passage and terminates a distance from the upper end of the casing. Above the upper end of this wall, the chamber 14 is in direct communication with the chamber or cylinder 15, the cylindrical formation of which is continued upwardly to the top of the casing. The upper end of the casing is closed by a suitable cover 18, bolted or otherwise fastened to the casing, as at 19, packing 20 being provided between the upper end of the casing and the cover to prevent leakage of oil therebetween.

The cover is provided with a tapped filling opening 21, which is closed with a screw plug 22, oil being delivered to the casing through said opening.

Figure 2:
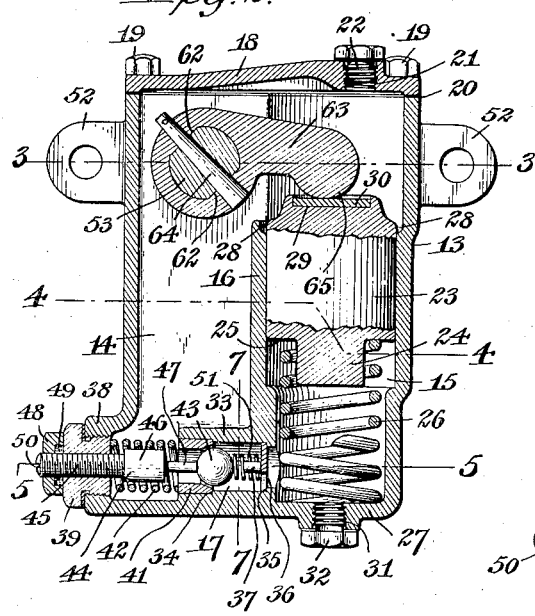
Fig. 2 is a central vertical section through the shock absorber.
Figure 5:
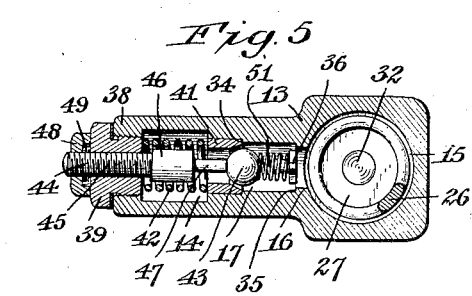
Fig. 5 is a horizontal section taken on line 5—5, Fig. 2.

Within the chamber or cylinder 15 a piston 23 is slidably fitted, said piston being preferably solid and having a reduced lower end 24 to form a downwardly facing shoulder 25 on said piston. Bearing with one end against said shoulder and surrounding said reduced portion 24 is an expansion spring 26, the other or lower end thereof bearing against the bottom 27 of the casing. It is to be noted that the chamber or cylinder 15 is reduced in diameter at its lower end and enlarged in diameter at its upper end; and while the entire chamber is cylindrical and has three different diameters, such a construction is not absolutely necessary, although by enlarging the upper end or portion of the cylinder, an oil groove 28 is furnished between the wall of said enlarged portion at its lower end and the upper end of the piston, and in this connection I wish to stress the fact that the upper end of the piston is above the bottom of said oil groove when in its normal position, as indicated in Fig. 2.

The piston is fitted to the central or intermediate portion of the cylinder, and therefore this portion only need be bored. The upper enlarged portion and the lower reduced portion of the cylinder may be left unfinished, since the lower reduced portion only enters the reduced lower end of the cylinder, while the piston moves with considerable clearance in the upper enlarged portion.

The upper end of the piston 23 has a circular depression 29 formed therein in which is fitted a hardened steel disk 30, for a purpose to appear hereinafter. The bottom 27 of the casing is provided with a tapped drain opening 31, which is closed with a screw plug 32 so that the oil within the casing can be conveniently drained whenever it is found necessary or desirable.

In its more restricted sense, the intermediate portion of the chamber or cylinder 15 is the true cylinder for said piston, that portion of the piston extending from the upper reduced portion thereof to the shoulder 25 I preferably refer to as the body of the piston, and when making reference to the upper end of the piston being in a plane above the bottom of the oil groove 28 when in its lowermost position, the body portion of the piston is referred to.

Figures 6, 7:
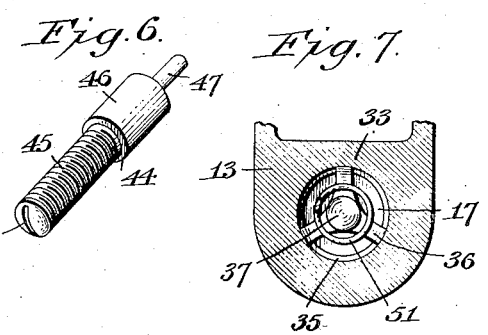
Fig. 6 is a detached perspective view of the adjustable valve stop.
Fig. 7 is an enlarged vertical section taken on line 7—7, Fig. 2.
Figure 3:
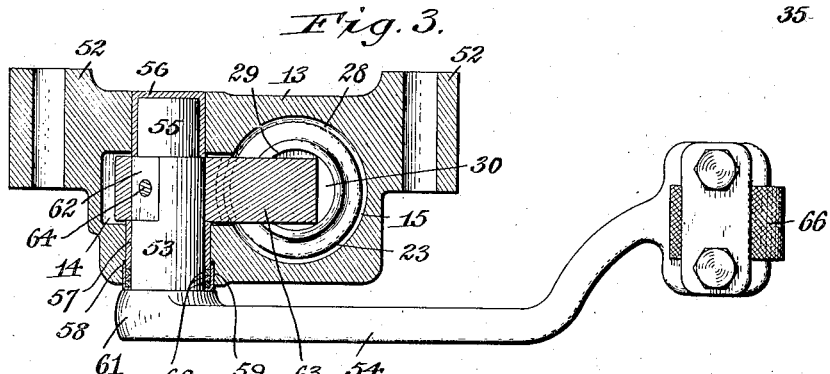
Fig. 3 is a horizontal section taken on line 3—3, Fig. 2.

The fluid passage 17 is formed by a wall 33 projecting from the wall 16 of the cylinder into the chamber 14 and extending from side wall to side wall, as clearly shown in Fig. 7. The passage 17 is preferably cylindrical and has a stepped reduction in diameter from its outer end inwardly, forming shoulders 34, 35, which are spaced apart, the diameter of the passage between the shoulder 35 and the interior of the cylinder 15 being therefore smaller than the adjacent intermediate portion and said intermediate portion being consequently smaller than the outer portion of said passage, which opens directly into the chamber 14.

Situated in the intermediate portion of the fluid passage 17 and bearing against the shoulder 35 is a bearing element in the form of a spider 36 having a stud 37 extending axially therefrom. The casing is provided with an internally threaded boss 38, the axis of which is coincident with that of the passage 17, and in this boss a cap 39 is threaded, packing 40 being provided between the flange of said cap and the end of said boss.

In the enlarged outer end of the passage 17, a thimble or sleeve 41 is slidably fitted, the inner end of said sleeve normally bearing against the shoulder 34 of said passage and the outer end thereof being preferably flush with the ends of the walls of said passage. Between the outer end of said thimble or sleeve and said cap is a spiral spring 42 which exerts its force against the outer end of the thimble or sleeve 41 to maintain the same against the shoulder 34, but is adapted to be compressed under certain operating conditions, to be hereinafter explained.

The inner end of the thimble or sleeve 41 is internally beveled, and spaced from the walls of said beveled portion is a spherical valve 43 held against an adjustable stop stud 44 threaded into and projecting outwardly and inwardly from the cap 39. This stop stud has an outer threaded portion 45, an enlarged intermediate portion 46 and a reduced inner portion 47. Said inner portion 47 is of smaller diameter than the outer threaded portion and extends into the thimble or sleeve 41, and by reason of its being comparatively small in diameter, occupies but little space centrally within said thimble or sleeve so as to restrict the passage through said thimble or sleeve as little as possible.

Threaded onto the outer projecting end of said stop stud is a lock nut 48 having its inner face recessed to receive packing 49 and thus guard against leakage of oil along the threads of said stud, said lock nut when tightened against the cap 39 retains the stop stud in adjusted position. For convenience, the outer end of said stop stud is provided with a kerf 50 so that it can be conveniently adjusted by using a screw driver or other similar tool, the inner end of said stud determining the space between the thimble or sleeve 41 and the spherical valve 43.

Surrounding the stud 37 of the spider 36 and bearing with one end against said spider and with its other end against the spherical valve 43 is a spiral spring 51, which is less powerful than the spring 42 surrounding the stop stud 40, and when said spring 51 is compressed, as will occur during the upward movement of the piston 23 within its cylinder 15, which action creates suction within the passage 17 and draws the spherical valve 43 inwardly against the action of the spring 51, said valve will be limited in its inward movement by the stud 37.

Oil is delivered into the casing through the filling opening 21 and is preferably maintained at a level above the upper end of the piston when in normal position. However, the construction is of such a nature that the operation of the device will be thoroughly effective if the level is below that stated.

Projecting from the casing 13 are securing lugs 52 by means of which the casing may be fastened to the frame or chassis of the vehicle, suitable bolts or other fastening means being provided for the purpose.

Extending transversely through the casing is a rock shaft 53, which is integral with a crank or actuating lever 54 extending from one end of said shaft. The shaft is reduced at its free end, as at 55, and this reduced end portion is entered into a cup-like bearing or bushing 56, of brass or other material, said bearing or bushing being fitted into one of the side walls of the casing and being closed at its outer end and open at its inner end to receive the reduced portion of said shaft. By the use of a bushing of this type, leakage of oil at this point is prevented. In the opposite side wall a sleeve bushing of brass or other material 57 is fitted, and the bore of the casing receiving the same is enlarged at its outer end, as at 58, to receive a cup-like washer-retainer 59 in which leather or other washers 60 are located, said washers being packed between the outer end of said sleeve bushing and the end wall of said cup-like retainer, which latter bears against the hub 61 of the crank or actuating lever 54.

That portion of the rock shaft positioned between the two side walls of the casing is cut away or flattened at opposite sides, as at 62, the flattened portions extending from the reduced end portion 55 of said shaft to a point in line or approximately in line with the inner side of the opposite wall or to the inner end of the sleeve bushing 57. Mounted on the flattened portion of the rock shaft is an actuating arm 63, and passed through its hub and through said shaft is a pin 64 to secure the two together. The outer end of this arm is provided with a rounded contact portion 65 adapted to bear against the circular hardened disk 33 at the upper end of the piston 23.

A strip of webbing or other flexible material 66 is secured with one end to the free end of said actuating lever 54 and it has its other end fastened to a clamp-fitting 67 clamped onto the axle 12 of the vehicle, said flexible connection 66 being held taut at all times by the spring 26 acting against the under side of the piston 23, which in turn forces the actuating arm 63 upwardly, and by reason of the rock shaft being rotated during the upward movement of said actuating arm, the actuating lever 54 is forced upwardly.

It is to be noted that the enlarged central portion 46 of the stop stud 44 has a diameter closely approximating that of the spiral spring 42 surrounding it so that when said spring is compressed or when it expands after compression, the movement of the convolutions will be in straight lines, thus preventing bulging of the spring and assuring an even pressure against the sleeve or thimble 41 at all times.

In Fig. 2 the parts are shown in normal position, and in this position a comparatively small annular space is provided between the sleeve or thimble 41 and the spherical valve 43, but it is to be understood that the valve 43 will move inwardly away from the sleeve or thimble 41 under certain conditions, while said sleeve or thimble will move away from the valve under other conditions, to be presently described.

The casing being provided with the necessary quantity of oil or other fluid, it is quite apparent that the fluid will fill the chamber or cylinder 15 to the lower end of the body portion of the piston, also the passage 17, and will reach an equal or higher level in the chamber 14, depending on the quantity of fluid in the casing. Under normal conditions I prefer that the level of the fluid be at least even with the upper edge of the curved or segmental wall 16 between the two chambers 14 and 15, and when at or above this level the oil or other fluid will also fill the annular groove 28 surrounding the upper end of the piston proper, forming a seal to prevent air being drawn downwardly into the cylinder and to keep the cylinder properly sealed to prevent the fluid oozing upwardly between the piston and cylinder.

When the vehicle to which the device is applied, travels over uneven roads, passes over ruts, or strikes an obstruction, the body of the vehicle will lower, due to its being supported by the springs of the vehicle, which become flexed; the result being that the casing moves downwardly with the body of the vehicle and positions the actuating lever 54 at an angle. This causes the actuating arm 63 to assume a similar position, in which the free end thereof more closely approaches the cap or cover 18 of the casing, with the result that the piston 23 is forced upwardly by the spring 26. This upward movement of the piston creates suction within the lower portion of the cylinder 15, also within the passage 17 connecting the chamber 14 with said cylinder, with the result that the spherical valve 42 is drawn inwardly against the action of the spring 51. This causes the annular space between said valve and the sleeve or thimble 41 to be enlarged and permits the fluid in the chamber 14 to be drawn in freely through said passage and into the cylinder, thereby lowering the level of the fluid in the chamber 14 and filling the enlarged lower portion of the cylinder 15.

When the chassis and body of the vehicle move upwardly, on what is generally termed the rebound, the casing moves upwardly with respect to the flexible connection 16, with the result that the actuating lever 54 will gradually assume a horizontal position, or a less inclined position, or an oppositely inclined position, depending in the first instance on the position of said lever when in normal position. However, as shown in the drawings the lever is substantially in horizontal position when the parts are normal, and consequently after assuming a rearwardly inclined position when the body lowers and the spring is flexed, the recovery of the body will return said lever to horizontal position, with the result that the free end of the actuating arm 63 will again assume the position shown in Fig. 2, causing the piston 23 to be depressed against the force of the spring 26. Under such conditions the oil is forced outwardly from the lower portion of the cylinder into the chamber 14. Immediately pressure is exerted in the passage 17 by the lowering of the piston, the ball valve 43 will be forced outwardly into a fixed position against the inner end of the stop stud 44, in which position said ball valve will again be spaced to restrict the passage between the same and the inner beveled end of the sleeve or thimble 41. It is clear therefore that when the piston rises, the suction created within the cylinder beneath said piston will cause an enlargement of the annular space between the two relatively movable regulating elements within the passage 17, allowing the fluid to be drawn in quickly to fill the lower portion of the cylinder; whereas, when the piston lowers the annular space between the two relatively movable parts is restricted and a slow escape of the fluid from the cylinder occurs. This results in a slow upward recovering movement of the body portion of the vehicle, and naturally a slow recovery of the springs to normal position, thereby preventing upthrow of the vehicle body and assuring comfortable riding for the occupants.

If, on the downward movement of the piston, the pressure within the cylinder becomes excessive or reaches a point beyond that fixed by the counter-force of the spring 42, said spring will become compressed due to the force of the fluid against the inner end of the sleeve or thimble 41, and under such conditions said sleeve or thimble will be moved outwardly. This outward movement, however, is comparatively gradual and exceedingly slow. During the outward movement of said sleeve or thimble, the spherical valve is retained in position between the inner end of the stop stud and the spiral spring 51, and therefore a gradual enlargement of the annular space between said valve and the beveled portion of the sleeve or thimble is provided so that the fluid may escape from the cylinder, in accordance with the pressure exerted therein by the lowering movement of the piston. The force required to overcome the expansion of the spring 44 is determined by any suitable means, and springs of different force or power are employed in vehicles of different makes, depending upon the weight of the frame and the body carried thereby, or the capacity load of the body.

It is to be noted that the hardened steel disk 30 does not completely fill said depression 29 and consequently the surrounding wall of said depression rises above the upper surface of said disk. When filling the casing with oil through the filling opening 21, oil will be delivered on said disk and be retained thereon by the circular wall surrounding it so that, during the actuation of the piston, the contacting faces of said disk and the rounded end of the actuating arm 63 will at all times be lubricated. This is a decided advantage, particularly when the level of the oil within the casing is below the plane of said disk when the piston is in its lowermost position, since a quantity of oil or at least a film of oil will at all times be retained in the circular depression above said disk.

The sleeve or thimble 41 and the spherical valve 43 may be referred to as spring-retained oppositely movable or yielding fluid regulating or controlling elements, one of which is retained by a spring more powerful than the spring of the other; these elements in preferred form, opening and closing in different directions. Although neither of these elements serve to completely shut off the passage in which they are located, each moves in a direction opposite to that of the other, to enlarge the size of the normally-restricted passage between the two, or in other words, to open said passage to a greater extent; and each moves in an opposite direction to diminish the passage, or in other words, to close the passage to normally restricted size.

Having thus described my invention, what I claim is:—

1. A shock absorber, comprising a casing having two chambers connected by a passage, oppositely movable elements within said passage controlling the flow of fluid therebetween from each chamber to the other, and means for causing the fluid to flow from each chamber to the other through said passage.

2. A shock absorber, comprising a casing having two chambers connected by a passage, means in one of said chambers to cause the flow of fluid from each chamber to the other, and means within said passage comprising two relatively movable parts normally restrictively spaced apart.

3. A shock absorber, comprising a casing containing a fluid and having two chambers connected by a passage, two spring-pressed elements within said passage normally restrictively spaced apart, means in one of said chambers to freely draw fluid through said passage from one of said chambers to the other chamber and to restrictively force fluid from said other chamber into said first mentioned chamber.

4. A shock absorber, comprising a casing having two chambers connected by a fluid passage, two spring-pressed elements normally spaced apart and adapted to be caused to separate to a greater degree when drawing fluid from one of said chambers into the other.

5. A shock absorber, comprising a casing having two chambers connected by a passage, two spring-pressed elements within said passage normally spaced apart and adapted to be caused to separate to a greater degree when forcing fluid from one of said chambers into the other under pressure exceeding a predetermined high point.

6. A shock absorber, comprising a casing having a cylindrical bore therein serving as a cylinder and a chamber connected with said cylinder by a fluid passage, two relatively movable elements within said passage normally restrictively spaced apart, springs of different power operating against said elements to maintain them in their restrictively spaced relation, a piston within said cylinder, and means for actuating said piston to cause the same to reciprocate therein.

7. A shock absorber, comprising a casing containing a fluid and being divided into two chambers, one of which serves as a cylinder, said casing having a fluid passage connecting said chambers, a spherical valve within said fluid passage, a sleeve within said passage from which said valve is normally restrictively spaced, a piston in the chamber serving as the cylinder, and means to cause reciprocation of said piston, said spherical valve being caused to move away from said sleeve during the suction action of said piston and to return to restrictively spaced relation to said sleeve during the pressure stroke of said piston, said sleeve being movable away from said valve when the pressure stroke of said piston creates a pressure in said passage exceeding a predetermined high point.

8. A shock absorber, comprising a casing containing a fluid and having a fluid chamber and a cylinder separated by a wall, a passage connecting said chamber and cylinder, an adjustable stop carried by the casing and having one end terminating within said passage, a valve spring-pressed against said stop, a sleeve within said passage retained in restrictively spaced relation to said valve, a piston within said cylinder, and means for causing reciprocation of said piston.

9. A shock absorber, comprising a casing having a cylinder and a piston within said cylinder, the cylindrical wall of said cylinder providing an oil groove around said piston to prevent the passage of air between the two and avoid seepage of the fluid therebetween.

10. A shock absorber, comprising a casing containing a fluid and having an internal cylinder and a chamber separated from said cylinder by a wall, said cylinder and chamber being connected by a passage having a shoulder therein, a sleeve within said passage having one end in contact with said shoulder, a spring to retain said sleeve against said shoulder, a valve within said passage normally in restrictively spaced relation to said sleeve, means to retain said valve in normal position, and a piston within said cylinder adapted for reciprocable movement and adapted to draw fluid from said chamber into said cylinder and force fluid from said cylinder into said chamber, said valve being adapted to move away from said sleeve when drawing fluid from said chamber into said cylinder.

11. A shock absorber, comprising a casing containing a fluid and having a chamber and a cylinder, said chamber and cylinder being connected by a passage having a shoulder, a bearing element within said passage in contact with said shoulder and arranged to permit the passage of fluid therethrough, a valve within said passage, a stop element to hold said valve in restrictively open position, a spring between said valve and said bearing element to retain said valve against said stop element, and a piston within said cylinder adapted for reciprocable movement.

12. A shock absorber having a fluid containing casing divided by a wall to provide a fluid-containing chamber and a cylinder, a passage between said chamber and cylinder, a pair of spring-pressed oppositely-opening elements in said passage normally spaced apart, and a piston within said cylinder adapted for reciprocable movement.

13. In a shock absorber, a chamber and a cylinder adapted to contain a fluid and a passage connecting said chamber and cylinder, a pair of oppositely-closing elements within said passage restrictively spaced apart, springs of different force acting against said elements to maintain the same in restrictively spaced relation, and a piston within said cylinder adapted for reciprocable movement.

14. A shock absorber, comprising a casing containing a fluid and divided into a fluid containing chamber and a cylinder, a passage between said chamber and cylinder having a restricted portion, a spring-pressed valve in said passage, a stop element against which said valve bears to maintain said valve in restrictively spaced relation to one end of said restricted portion, and a piston within said cylinder adapted for reciprocable movement.

15. A shock absorber, comprising a casing divided internally into a fluid containing chamber, a cylinder and a passage connecting said chamber and cylinder, a tapped opening in said casing having a cap threaded thereinto, a stop stud adjustably arranged through said cap and extending into said passage, a spherical valve in said passage, a spring in said passage acting against said valve to retain the same against said stop stud, and a piston reciprocable in said cylinder.

16. A shock absorber, comprising a casing containing a fluid and divided to form a chamber and cylinder, a passage connecting said chamber and cylinder, a stop stud extending from one wall of said cylinder into said passage, a sleeve fitting into said passage, a spring surrounding said stud and bearing with one end against said sleeve, a spherical valve held in restrictively spaced relation to said sleeve and spring-pressed against said stop stud, and a piston reciprocable within said cylinder.

17. A shock absorber, comprising a casing containing a fluid and having a chamber, a cylinder and a passage connecting said chamber and cylinder, one wall of said casing having a tapped opening, a cap threaded into said opening, a stop stud adjustably threaded through said cap and extending into said passage, a jamb nut applied to said stop stud to retain the same in adjusted position, a sleeve fitting into said passage and having its bore beveled at its inner end, a coil spring surrounding said stud and bearing with opposite ends against said cap and said sleeve, respectively, a spherical valve spring-pressed against said stop stud and normally in restrictively spaced relation to the beveled portion of said sleeve, and a piston reciprocable within said cylinder.

18. A shock absorber, comprising a casing containing a fluid and having a chamber, a cylinder and a passage connecting said chamber and cylinder, said passage being formed in three different diameters providing two spaced shoulders, a spider bearing against one of said shoulders and having a stud projecting axially therefrom, a sleeve fitting within said passage and bearing with one end against the other shoulder, a spherical valve held in spaced relation to the inner end of said sleeve, means to prevent said valve lying in contact with said sleeve, a spring surrounding the stud of said spider and bearing with one end against said spider and with its other end against said spherical valve, and a piston reciprocable within said cylinder.

19. A shock absorber, comprising a casing having lugs to secure the same to the chassis of a vehicle and being divided to form a chamber and a cylinder, a passage between said chamber and said cylinder, means within said passage to allow a free flow of fluid from said chamber to said cylinder and to retard the flow of fluid from said cylinder to said chamber, a piston within said cylinder, a spring between the bottom wall of said cylinder and the lower end of said piston, a shaft extending transversely through said casing, an actuating arm secured to said shaft and bearing against the upper end of said piston, and an actuating lever extending from said shaft and adapted for connection with a part of the vehicle.

20. A shock absorber, comprising a casing containing a fluid and being divided into a chamber, a cylinder and a passage connecting said chamber and cylinder, means within said passage to cause differential flow of fluid in opposite directions, said cylinder having a reduced lower end, a piston within said cylinder having a shoulder, a coil spring bearing with its lower end against the bottom wall of said cylinder and having its upper portion surrounding the reduced lower end of said piston and the upper end thereof in contact with the shoulder of said piston.

21. A shock absorber, comprising a casing containing a fluid and divided by a wall extending from the bottom of the casing upwardly and terminating a distance from the top of said casing, the interior of the casing at one side of said wall serving as a chamber and at the other side thereof a cylinder, a passage connecting the lower ends of said chamber and cylinder and having means therein to control the flow of fluid from the chamber to the cylinder and reversely, a piston within said cylinder, a spring within the lower portion of said cylinder acting against said piston, a shaft extending through the upper end of said chamber, an actuating arm secured to said shaft within said casing and extending into the upper end of said cylinder, said arm being in contact with the upper end of said piston, and an actuating element outside of said casing extending from said shaft.

22. A shock absorber, comprising a casing having a cylinder and a piston, said piston having a depression in its upper end, a wearing plate fitting into said depression, an actuating arm in contact with said wearing plate, and a spring acting against said piston to retain the same in contact with said actuating arm.

23. A shock absorber, comprising a casing containing a fluid and having a fluid chamber and a cylinder in communication at their upper ends and a fluid passage connecting the lower end of said chamber with the lower end of said cylinder, a piston within said cylinder, means within said passage to control the differential flow of fluid therethrough in opposite directions, a spring serving to hold said piston elevated, a crank shaft extending transversely through said casing at the upper end of said chamber, an actuating arm secured to said crank arm and extending from said chamber into said cylinder and lying in contact with the upper end of said piston, and a lever outside of said casing extending from said shaft.

24. In a shock absorber, a casing containing a fluid and having a wall extending from its lower end upwardly and terminating a distance from the upper end of said casing, said wall dividing said casing into a fluid-containing chamber and a cylinder, the upper portion of the cylinder being enlarged from a plane slightly beneath the upper edge of said wall and said wall having a notch at its upper edge conforming to the diameter of the enlarged upper portion of said cylinder, a piston within said cylinder normally projecting with its upper end into the enlarged portion thereof so as to form an oil groove around said piston at the lower end of the enlarged portion of said cylinder and at the upper end of said wall, a spring tending to force said piston upwardly, a shaft extending transversely through said casing at the upper end of said chamber, an actuating arm secured to said shaft extending through the opening connecting the upper end of said chamber with said cylinder, said actuating arm being in contact with the upper end of said piston, and an actuating lever extending from said shaft.

25. In a shock absorber, a casing having an internal cylinder, a piston within said cylinder and a fluid seal surrounding the upper end of said piston when in normal position, said seal being maintained during the actuation of said piston.

26. A shock absorber, comprising a casing having an internal cylinder, a piston within said cylinder, and a fluid containing groove formed between said cylinder and the upper end of said piston when in normal position.

27. In a shock absorber, a cylinder, a piston within said cylinder, and means embodied in the construction of said cylinder and piston to provide a sealing ring of fluid around said piston.

28. A shock absorber having a casing provided with a fluid chamber and an enlarged portion at one side of said fluid chamber machined to form a cylinder, a passage connecting the lower end of said chamber with said cylinder, a drain opening at the lower end of said cylinder, a plug closing said drain opening, a cover for said casing having a filling opening, a plug for said filling opening, a piston within said cylinder, means for causing reciprocation of said piston, and means within said passage to allow the free passage of fluid therethrough when said piston is moved in one direction and for retarding the passage of fluid therethrough when moving the piston in the opposite direction.

29. A shock absorber having a casing provided with alined openings in opposite walls, a thimble-like bushing fitted into one of said openings and closing the outer end of said opening, a sleeve bushing in the other opening of said casing, a shaft extending through said last-mentioned bushing and having one end thereof entered in said thimble-like bushing, a lever at the opposite end of said shaft outside of said casing, an actuating arm secured to said shaft between its bearings, and a piston within said casing against the upper end of which said actuating arm bears.

30. A shock absorber, comprising a casing having alined openings in opposite walls and an internal cylinder, a thimble-like bushing secured in one of said openings and closing the outer end thereof, a sleeve bushing in the opposite opening terminating a distance from the outer end of said opening, a cup-like washer retainer fitting into the outer portion of said last-mentioned opening and receiving the outer end of said sleeve bushing, washers between the outer end of said sleeve bushing and the outer wall of said washer retainer, a shaft extending through said retainer, washers, and sleeve bushing and having a reduced end portion fitting in said thimble bushing, an actuating lever at the opposite end of said shaft, an actuating arm secured to said shaft between said bushings and extending into the upper end of said cylinder, a piston within said cylinder having its upper end in contact with said actuating arm, and a spring for maintaining said piston in contact with said arm.

31. In a shock absorber, a casing having a cylinder, a solid piston within said cylinder having a circular depression at its upper end, a hardened disk within said depression, and an actuating arm having a rounded outer end lying in contact with said hardened disk.

32. A shock absorber, comprising a casing containing fluid and having a chamber, a cylinder and a passage connecting said chamber and cylinder, and opposing closure elements within said passage operating to permit the free flow of fluid through said passage in one direction and to retard the flow of fluid therethrough in the opposite direction.

33. A shock absorber, comprising a casing containing a fluid and having a chamber and a cylinder therein, a passage connecting said chamber and cylinder, a piston within said cylinder, and opposing closure elements within said passage, said closure elements being retained in restrictively spaced relation under different spring pressures, one of said closure elements moving away from the other under suction of said piston and moving toward the other under pressure created by said piston, the other closure element moving away from its co-operating closure element only when the pressure created by said piston exceeds a predetermined high point.

34. A shock absorber comprising a casing, a cylinder within said casing, a piston within said cylinder having a depression in its upper end, a wearing plate fitting into said depression and having its upper face in a plane below the upper edge of the wall surrounding said plate, an actuating arm in contact with said wearing plate, and a spring acting against said piston to retain the same in contact with said actuating arm.

35. In a shock absorber, a piston, and an actuating arm bearing against said piston to cause the same to move in one direction, said piston embodying in its construction means to assure continual lubrication of the piston and actuating arm at their contacting point.

36. In a shock absorber, a piston having a circular depression in its upper end, a wearing disk fitted within said depression and having its upper face in a plane below the upper edge of the wall surrounding said disk, and an actuating arm bearing against said wearing disk, the contact points of said disk and arm being lubricated by oil contained in said depression above said disk.

37. In a shock absorber, a piston and an actuating arm bearing against said piston to cause the same to move, and means at the contacting point of said actuating arm and piston assuring continual lubrication of the two at said contacting point.

38. In a shock absorber, a piston and an actuating arm bearing against said piston to cause the same to move, one of said elements having means to retain a lubricant to assure continual lubrication at the point of contact of said actuating arm with said piston.

39. A shock absorber comprising a casing having two chambers connected by a passage and supplied with a fluid, a piston within one of said chambers, and valve mechanism within said passage comprising oppositely movable elements and springs retaining said elements in predetermined relation, said elements being controlled in movement against the action of said springs by said piston and the fluid between said piston and said valve mechanism.

40. A shock absorber comprising a casing having two chambers connected by a passage, a piston within one of said chambers, and valve mechanism within said passage having oppositely-pressed movable elements between which the fluid is passed when moving from each of said chambers to the other upon effective manipulation of said piston.

In testimony whereof I affix my signature.

ADOLPH W. F. MANZEL.